United States Patent
Kang et al.

(10) Patent No.: US 11,704,797 B2
(45) Date of Patent: Jul. 18, 2023

(54) METHODS OF OBTAINING 3D RETINAL BLOOD VESSEL GEOMETRY FROM OPTICAL COHERENT TOMOGRAPHY IMAGES AND METHODS OF ANALYZING SAME

(71) Applicant: BIO-TREE SYSTEMS, INC., Framingham, MA (US)

(72) Inventors: Kongbin Kang, Providence, RI (US); Yanchun Wu, Sharon, MA (US); Raul A. Brauner, Framingham, MA (US)

(73) Assignee: BIO-TREE SYSTEMS, INC., Framingham, MA (US)

( * ) Notice: Subject to any disclaimer, the term of this patent is extended or adjusted under 35 U.S.C. 154(b) by 0 days.

(21) Appl. No.: 17/182,971

(22) Filed: Feb. 23, 2021

(65) Prior Publication Data

US 2022/0020144 A1    Jan. 20, 2022

Related U.S. Application Data

(63) Continuation of application No. 15/474,513, filed on Mar. 30, 2017, now abandoned.

(60) Provisional application No. 62/316,490, filed on Mar. 31, 2016.

(51) Int. Cl.
*G06T 7/00* (2017.01)

(52) U.S. Cl.
CPC .. *G06T 7/0012* (2013.01); *G06T 2207/10101* (2013.01); *G06T 2207/30041* (2013.01); *G06T 2207/30101* (2013.01)

(58) Field of Classification Search
None
See application file for complete search history.

(56) References Cited

U.S. PATENT DOCUMENTS

| | | | |
|---|---|---|---|
| 8,761,466 B2* | 6/2014 | Kang | G06T 7/74 382/128 |
| 2013/0195340 A1* | 8/2013 | Iwase | G06T 7/0012 382/131 |
| 2016/0239956 A1* | 8/2016 | Kang | A61B 6/5247 |
| 2017/0035286 A1* | 2/2017 | Meyer | A61B 3/0041 |
| 2017/0319061 A1* | 11/2017 | Spaide | A61B 3/0041 |

\* cited by examiner

*Primary Examiner* — Vikkram Bali
(74) *Attorney, Agent, or Firm* — The Roy Gross Law Firm, LLC; Roy Gross

(57) ABSTRACT

Embodiments relate to extracting blood vessel geometry from one or more optical coherent tomography (OCT) images for use in analyzing biological structures for diagnostic and therapeutic applications for diseases that can be detected by vascular changes in the retina. An OCT image refers generally to one or more images of any dimension obtained using any one or combination of OCT techniques. Some embodiments include a method of identifying a region of interest of a retina from a plurality of retinal blood vessels in at least one optical coherence tomography (OCT) image of at least a portion of the retina. Some embodiments include a method of distinguishing between a plurality of retinal layers from vessel morphology information of retinal blood vessels in at least one optical coherence tomography (OCT) image of at least a portion of the retina.

12 Claims, 6 Drawing Sheets

METHODS OF OBTAINING 3D RETINAL BLOOD VESSEL GEOMETRY FROM OPTICAL COHERENT TOMOGRAPHY IMAGES AND METHODS OF ANALYZING SAME

This application claims priority from U.S. Provisional Patent Application Ser. No. 62/316,490, filed Mar. 31, 2016, the disclosure of which is incorporated herein by reference in its entirety.

BACKGROUND

A wide range of imaging methods and devices are commonly used to evaluate physiological conditions. Tools have been developed to image body structures based on different physical properties. For example, X-rays, CT scans, MRIs, PET scans, IR analyses and other technologies have been developed to obtain images of various body structures. These tools are routinely used for diagnostic, therapeutic, and research applications. More recently, Optical Coherent Tomography (OCT) has been used to capture three-dimensional images from with biological tissue, and specifically the eye. In fact, OCT is well suited to ophthalmic applications. In these applications, OCT can be used to take a cross-section of the retina.

However, the data obtained using OCT must be processed and analyzed. It would be beneficial if there were a method and apparatus that was capable of processing these OCT images. More particularly, it would be advantageous if this method could determine which layer of the retina each point in the OCT scan belonged to. Further, it would be beneficial if the method and apparatus could accurately reconstruct the vasculature from the OCT scan.

SUMMARY

Some embodiments relate to extracting blood vessel geometry from 3D images comprising more than one optical coherent tomography (OCT) images for use in analyzing biological structures for diagnostic and therapeutic applications for diseases that can be detected by vascular changes in the retina. A 3D OCT image refers generally to one or more images of any dimension obtained using any one or combination of OCT techniques including, but not limited to, OCT, contrasted OCT, OCT angiography (OCTA), swept source OCT, en face OCT, etc. In particular, certain embodiments relate to extracting geometry from one or more OCT images of blood vessels to identify structural features useful for detecting, monitoring, and/or treating diseases, and/or for evaluating and validating new therapies.

Some embodiments include a method of identifying a 3D region of interest of a retina from a plurality of retinal blood vessels in a 3D optical coherence tomography (OCT) image, comprising a plurality of OCT images, of at least a portion of the retina, the method comprising using at least one computer programmed to perform evaluating at least one first morphological feature of a plurality of retinal blood vessels detected in the 3D OCT image, and identifying a first region of interest based at least in part on evaluating the at least one first morphological feature of the plurality of blood vessels.

Some embodiments include a method of distinguishing between a plurality of retinal layers from vessel morphology information of retinal blood vessels in a 3D optical coherence tomography (OCT) image, comprising a plurality of OCT images, of at least a portion of the retina, the method comprising using at least one computer programmed to perform evaluating at least one first morphological feature of at least one retinal blood vessel at each of a plurality of voxel locations in the 3D OCT image, and determining that at least one first voxel location of the plurality of voxel locations belongs to a first layer of the plurality of retinal layers and that at least one second location of the plurality of voxel locations belongs to a second layer of the plurality of retinal layers based on evaluating the at least one first morphological feature.

Some embodiments include a method of determining scale at each of a plurality of voxels of a 3D coherence tomography (OCT) image, comprising a plurality of OCT images, of at least one retinal blood vessel using an orientation independent scale detector having a size defined by a radius, the scale indicative of a distance from the respective voxel to a wall of a retinal blood vessel, the method comprising using at least one computer programmed to perform applying the scale detector at a first voxel of the plurality of voxels using a plurality of radii to obtain a response for each of the plurality of radii, each response having plurality of values, ordering the plurality of values in each response to obtain a plurality of ordered responses, each of the plurality of ordered responses corresponding to a respective radius, selecting one of the plurality of radii as a first scale candidate based, at least in part, on a result of evaluating each of the plurality of ordered responses according to a first function, selecting one of the plurality of radii as a second scale candidate based, at least in part, on a result of evaluating each of the plurality of ordered responses according to a second function, selecting, as the scale at the first voxel, either the first scale candidate or the second scale candidate based on a first criteria.

Some embodiments include a method of determining scale at each of a plurality of voxels of a 3D optical coherence tomography (OCT) image, comprising a plurality of OCT images, of at least one retinal blood vessel using an orientation independent scale detector having a size defined by a radius, the scale indicative of a distance from the respective voxel to a wall of a retinal blood vessel, the method comprising at least one computer programmed to perform applying the scale detector at a first voxel of the plurality of selected voxels using a plurality of radii to obtain a response for each of the plurality of radii, each response having plurality of values, ordering the plurality of values in each response to obtain a plurality of ordered responses, selecting one of the plurality of radii as a first scale candidate based, at least in part, on a result of evaluating an average of the lowest k values in each respective ordered response.

BRIEF DESCRIPTION OF THE FIGURES

For a better understanding of the present disclosure, reference is made to the accompanying drawings, which are incorporated herein by reference and in which:

FIG. 4A shows the result from a classical centerline filter and FIG. 4B shows the result from the improved centerline filter, which results in a more consistent vein segmentation and linking;

FIG. 5A shows non-proliferative diabetic retinopathy and FIG. 5B shows normal retinopathy.

Figure 1:
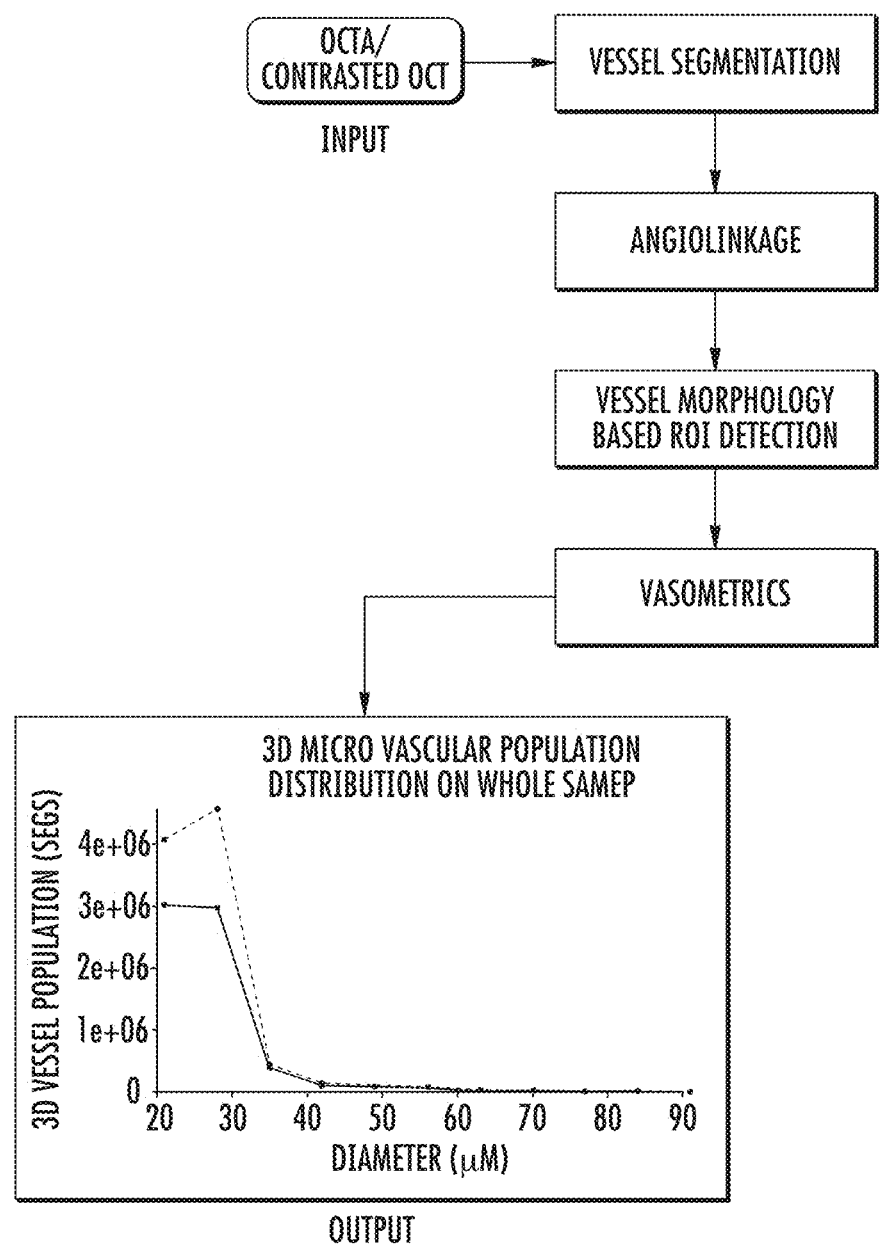
FIG. 1 illustrates a flow chart for the invivo retina vessel morphology information extraction system.

According to some embodiments, methods and apparatus for retina micro-vessel segmentation and morphology based region retrieval from 3D OCT Angiograph images are described.

Methods and apparatus for extracting vessel geometry from OCT images (e.g., a 3D OCT image of a retina or a portion of a retina) are disclosed. These methods and apparatus relate to obtaining vessel geometry, determining one or more structural features from the vessel geometry, and/or analyzing the one or more structural features for retinal diagnostic, prognostic, and/or research applications. The methods described herein are useful for obtaining a geometrical representation of a vascular tree or vessel network of retinal blood vessels from more than one OCT images (e.g., a 3D OCT image) that contains data relating to three-dimensional location, orientation and/or size points in the vascular tree. In some embodiments, a vascular tree may be represented by a series of disks or poker chips (e.g., circular or elliptical disks) that are linked together to form a three-dimensional structure containing information relating to the local size, shape, branching, and other structural features at any point in the vascular tree (e.g., a retinal blood vessel network).

It should be appreciated that the entire vascular tree of a retina may be represented by a network of linked poker chips (e.g., circular or elliptical disks). However, in many embodiments, only a subset or a portion of a vascular tree of the retina may be represented or analyzed. In some embodiments, a portion of a vascular tree can be represented by a single disc or poker chip that contains information relating to the location of the center of the vessel, vessel size (diameter), and/or orientation (e.g., the direction of the centerline of the vessel). In some embodiments, a portion of a vascular tree may be represented by a dataset that describes one or more poker chips along with information relating to the linkage between the poker chips within a region of interest of the vascular tree.

The present disclosure includes techniques for detecting at least one feature associated with a retinal blood vessel in a 3D OCT image of the retina or a portion of the retina and obtaining the geometry of the retinal blood vessels in the 3D OCT image. Some exemplary techniques for detecting and extracting geometry of blood vessels from one or more images (e.g., an OCT image) are described below and in U.S. Pat. No. 8,761,466, titled "Methods of Obtaining Geometry from Images," which is incorporated by reference in its entirety. Some techniques described therein may be referred to herein generally as AngioTrack™ and/or, in the context of the retina, RetinaAngioTrack™ or RetinaAngioTree™. However, it should be appreciated that these techniques are merely exemplary, as the embodiments are not limited to the techniques described therein. AngioTrack™ techniques may be used to obtain the geometry of a blood vessel network from one or more images (e.g., a 3D OCT image) for use in detecting, monitoring, and/or treating diseases, and/or for evaluating and validating new therapies (e.g., in human subjects or in other animals, for example other mammals).

Some embodiments include a method of linking geometry obtained from one or more images (e.g., a 3D OCT image) to form a linked blood vessel network (e.g., a retinal blood vessel network) that can be analyzed and mined for, for example, diagnostic and/or therapeutic purpose. Exemplary techniques for linking geometry (e.g., poker chips obtained from one or more images forming a Poker Chip representation) are described in further detail in the U.S. Pat. No. 8,761,466 and in International Publication Number WO 2014/143974 A1, titled "Methods and System for Linking Geometry Obtained from Images," which is incorporated herein by reference in its entirety. Some techniques described in these references are generally referred to as linking or AngioLinking™ and/or, in the context of the retina, RetinaAngioLinking™ or RetinaAngioTree™. It should be appreciated that the techniques described in these references are merely exemplary, as the embodiments are not limited to the techniques described therein. Techniques described herein can be used on humans or other animals.

In certain embodiments, the geometry of a blood vessel network (e.g., a retinal blood vessel network obtained from one or more OCT images) may be mined for physiological, biological, and/or medical purposes. For example, a linked or unlinked poker chip representation of a retinal blood vessel network may be analyzed for diagnostic, monitoring and/or therapeutic purposes. Accordingly, aspects of the invention relate to obtaining vessel geometry, determining one or more structural features from the vessel geometry, and/or analyzing the one or more structural features for medical diagnostic, prognostic, and/or research applications. Techniques for analyzing blood vessel geometry (e.g., a retinal blood vessel network) are described below, the '466 patent, the '971 Publication, and U.S. Publication No. 2015/0302584, titled "Vascular Analysis Methods and Apparatus," which is incorporated by reference in its entirety. Some techniques described therein may be referred to generally as AngioProbe™ or, in the context of the retina, RetinaAngioProbe™.

Some embodiments relate to automatically segmenting vessel structure out of 3D OCTA dataset and mining information for the earlier detection, intervention and monitoring the eye diseases, like diabetic retinopathy, etc. The system to achieve this result may include 4 subsystems: 1) vessel segmentation, 2) linking, 3) vessel morphology based ROI extraction and 4) vasometrics retrieval.

As shown in FIG. 1, the blocks represent exemplary subsystems. The blocks can be implemented in a number of different ways. For example, the blocks may be implemented using hardware, software or a combination thereof. When implemented in software, the software code can be executed on any suitable processor or collection of processors, whether provided in a single computer or distributed among multiple computers. It should be appreciated that any component or collection of components that perform the functions described herein can be generically considered as one or more controllers that perform the disclosed functions. The controllers can be implemented in numerous ways, such as with dedicated hardware, or with general purpose hardware, such as personal computers, that is programmed using microcode or software to perform the functions recited herein.

It should be appreciated that the various methods outlined herein may be coded as software that is executable on one or more processors that employ any one of a variety of operating systems or platforms. Additionally, such software may be written using any of number of suitable programming languages and/or conventional programming or scripting tools, and also may be compiled as executable machine language code. It should be appreciated that one embodiment is directed to a non-transitory computer-readable medium encoded with one or more programs that, when executed, on one or more computers or other processors, perform the methods that implement the various embodiments disclosed herein.

Returning to FIG. 1, the data acquisition module will generate a set of 3D images in the region of interest. The 3D invivo images may either be from a OCT Angiography or contrasted OCT scan. In the former case, blood vessels are contrasted by blood flow speed or the decorrelation. In the latter case, patient is injected contrast agent to increase the signal noise ratio between vessels and tissues, then a retina region of interest, i.e. macula region, is scanned by a high resolution OCT scanner.

This set of images is fed into a vessel segmentation block to generate a set of unlinked poker chips which is used for data mining. The unlinked poker chips output from this vessel segmentation block contains information relating to the location of the center of the vessel, vessel size (diameter), and/or orientation (e.g., the direction of the centerline of the vessel). Then those poker chips are fed into the Angiolinkage block to recover all the morphological branching structure of a vessel network. Based on the recovered vessel morphology, the region of interests can be extracted by the ROI detector block. Those ROI can be a disease region for the purpose of disease monitoring, a retina layer for diabetes diagnosis, and etc. The final result of Vasometrics is output by a vasometric block and saved to storage or output, such as to a graph. Each of these blocks is described in more detail below.

Some embodiments exhibit one or more of the following advantages, though exhibiting such advantages is not a requirement:
  1. An 3D Angiotrack (not 1D or 2D feather) based system to reliably extract vessels segments (poker chips) from OCTA invivo scan.
  2. An Angiolinking based system to extract branching structures and vessel morphology structures.
  3. Use vessel morphologic information to separate Region of Interests
  4. An set of branching-morphology based vasometrics may be used for the purpose of earlier detection, intervention and monitoring the eye disease, i.e. diabetic retinopathy The exemplary systems can also be applied to CT scan of the exvivo retina data.

Region of Interest (ROI) Extraction Using Vessel Morphology

Figure 2:
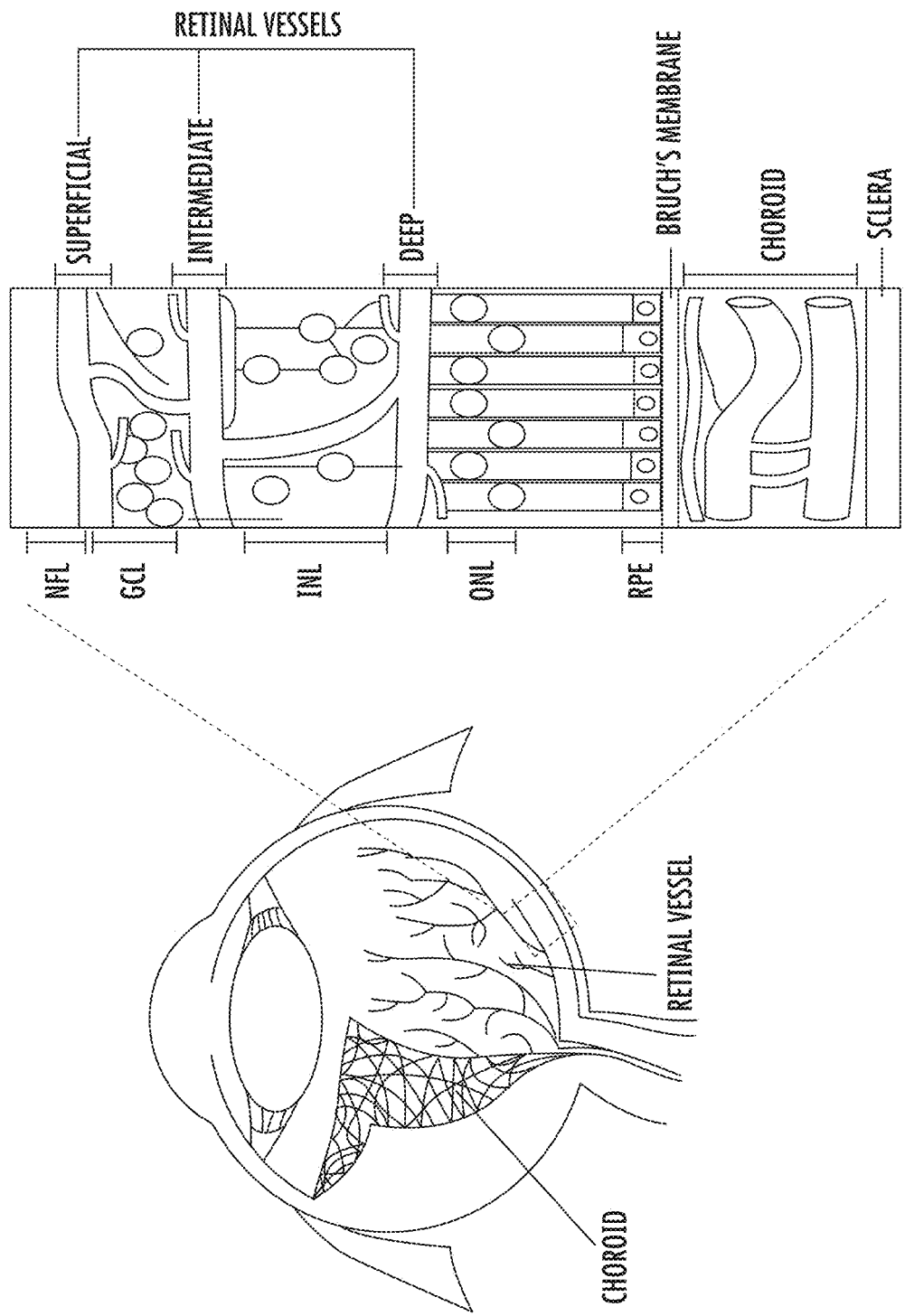
FIG. 2 shows an illustration showing the retina layers defined by vessels.

The block labelled "Vessel Morphology based ROI detection" in FIG. 1 is now described in more detail. Many retina functional regions, e.g. layers and disease regions, can be separated based on the vessel morphology structures. FIG. 2 shows the layers of vessels and tissues. As shown in this illustration, the vessels lay flat on the layers. There are vessel morphology differences between the various layers. For example, the deep layer has vessels with dense branching structure and relative uniform diameters; while the intermediate layer has vessels of sparse branching points and large range of vessel diameters. Using such vessel morphology differences, retina layers are separable and differentiated.

According to some embodiments, the procedure to extract ROI based on vessel morphology is as follows:
  compute a morphology based feature field $D(x, y, z)$ which is a function of vessel diameter, vessel density, vessel branching point density, vessel direction and vessel diameter.
  construct a likelihood or energy function of the $D(x, y, z)$ belonging to ROI
  construct a penalty function to control how much influence neighbor positions can affect each other (smoothness term)
  Extract ROI based on the smoothness requirement of the ROI and data agreement with model Provided below is an example of separating Retina layers. As described above, each layer of the retina may have specific characteristics that are unique to that layer. Consequently, by comparing the vasculature to predetermined characteristics associated with various layers, it is possible to determine which layer each point in a scan belongs to.

For example, according to some embodiments, a 3D scalar density field, $D=\{\varphi(x, y, z)\}$, of vessels information at every point $(x, y, z)$ is computed from linked or unlinked vessel poker chips. The goal or target is to label each point $l(x, y, z)$ for the layer it belongs to. Suppose that L is the set of labels of the layer number on each point, $L=\{l(x, y, z)\}$ for any $(x, y, z)$.

According to some embodiments, retinal layers are separated or labeled from a directional vessel density field $D(x, y, z)$. In other embodiments, other parameters may be used to separated or label the layers. In this example, D is the density of vessels projected to the trans-axis plane. The labelling can be written as:

$$L^* = \max_L P(L | D) \propto \max_L P(L, D) \tag{1}$$

Consider $$P(L, D) = \prod_{x,y,z} P(D(x, y, z) | L(x, y, z)) \prod_{x',y',z' \neq x,y,z} P(L(x', y', z'), L(x, y, z))$$

A piece wise model can be used, then the joint probability of neighbor point i and j can be denoted as $\psi(i,j)$. If the posterior likelihood is denoted as $\varphi(i)$, then the joint probability can be rewritten as:

$$P = \prod_i \Phi(i) \prod_{j \in N(i) \setminus i} \Psi(i, j)$$

where $N(i)\setminus j$ is the neighborhood of i except j. In one example, $$\Phi(i) = \frac{1}{2\sqrt{\pi}\,\sigma_{l(i)}} e^{-\frac{(D(i)-u_{l(i)})}{2\sigma_{l(i)}^2}}$$

and $$\Psi(i, j) = \frac{1}{2\sqrt{\pi}\,\alpha} e^{-\frac{(l_i-l_j)^2}{2\alpha}}$$

This equation is solvable by Belief Propagation. The message that node i sends to node j may be denoted as $m_{ij}$, and $m_{ii}$ is the message that the observation $D_i$ sends to node i. We also denote $b_i$ as the belief of node i. Then the update rules are as follows:

$$m_{ij}(l_j) = \frac{1}{Z} \sum_{l_i} \Psi(i,j) m_{ii}(l_i) \prod_{k \in N(i) \setminus i} m_{ki}(l_i)$$

$$b_i(l_i) = \frac{1}{Z} m_{ii}(l_i) \prod_{k \in N(i) \setminus i} m_{ki}(l_i)$$

The label L* is obtained by initially assigning a uniform message $m_{ij}(1)$. On the iteration t, the message $m_{ij}^t$ and belief $b_i^t$ are updated according to the above rule. The label $L^{*t}$ is computed by $$L(i)^{*t} = \operatorname*{argmin}_{l_i} b_i(l_i)$$

the model parameter at iteration t may be computed using:

$$\mu_l^t = \frac{\sum_{t^i(i) = l} D(i)}{N - 1}$$

and $$\sigma_l^t = \sqrt{\frac{\sum_{t^i(i) = l} (D(i) - \mu_l^t)^2}{N - 1}}$$

Figure 3A:
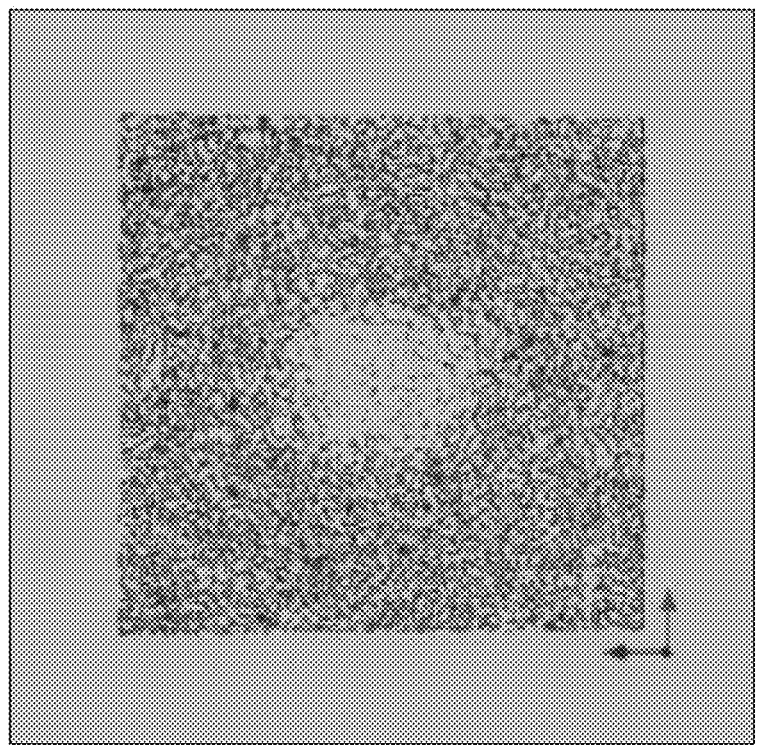
FIGS. 3A-B are an example of layer detection based on retina vessel morphological differences between the deep and the intermediate layers.
Figure 3B:
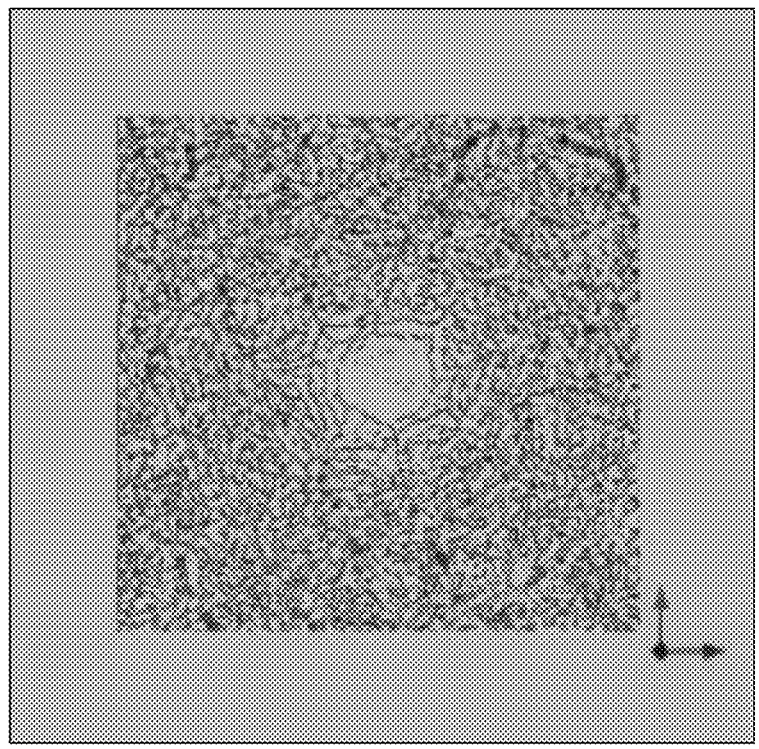

Using this algorithm, the specific layer of the retina may be determined. FIG. 3 shows an example of layer detection based on retina morphological differences. As stated above, the intermediate layer has vessels of sparse branching points and large range of vessel diameters. The algorithm described above is able to identify the right figure as the intermediate layer.

Vessel Segmentation and Linking

Vessel segmentation of retinal blood vessels from OCT, contrasted OCT and/or OCTA images (collectively referred to as OCT) may be performed using various techniques. According to some embodiments, these techniques may be supplemented with further techniques described herein to produce a linked poker chips for retina blood vessels from one or more OCT images of the retina or a portion thereof.

Normally, the intensity of 3D image outside of a vessel is significant lower than the intensity inside the vessel. This rapid intensity decay enables the detection of scale. Mathematically, a ratio of a given location X is calculated for measuring the intensity decay by:

$$\mathcal{R}(X, r) = \frac{f_-(\{I(X') : |X' - X| = r + 1\})}{\min_r \{f_+(\{I(X') : |X' - X| = 1, \ldots, r\})\}}$$

where $f_-$ and $f_+$ are a rank functions, respectively. Given noise models, there are a lot of ways to choose those rank functions. In order to cope with reconstruction effects, $f_-$ may be chosen as the median value of last 8 lowest intensities and $f_+$ may be chosen as the median value of top 8 highest intensities. With the ratio response, the scale $\sigma_r(X)$ may obtained by finding the minimum radius r so that $\mathcal{R}(X, r)$ reach the threshold a and the next larger radius has smaller ratio:

$$\sigma(X) = \min_r \left\{ \mathcal{R}(X, r) < \frac{1}{\alpha} \land \mathcal{R}(X, r + 0.5) \le \mathcal{R}(X, r) \right\}$$

This formula holds for the large vessels in the OCTA 3D images. However, due to the weak signal of the velocity or phase information presented in the small and medium size vessels, the angiotrack scale detection may behave incorrectly in the small and middle size vessels. A more robust scale estimator for small and middle size vessels has to be constructed. Some embodiments include a rank based scale filter which is not sensitive to the weak signals of the noise and outliers. Given a point X inside a vessel, the rank based scale filter may be defined as:

$$\mathcal{R}_1(X, r) = \frac{\|\{X' : r < |X' - X| \le r + 1 \land I(X') < T_B\}\|}{\|\{X' : |X' - X| \le r\}\|}$$

where $T_B$ is an intensity threshold and the normal of the set, $\| \|$, is defined as the number of points of the set. Then the scale $\sigma^1(X)$ is obtained by finding the minimum radius r so that $\mathcal{R}_1(X, r)$ reach the threshold $T_{R1}$ and the next larger radius has smaller ratio:

$$\sigma^1(X) = \min_r \{\mathcal{R}_1(X, r) < T_{R1} \land \mathcal{R}_1(X, r + 0.5) \le \mathcal{R}_1(X, r)\}$$

Here the value of $T_{R1}$ normally is chosen to be 0.05. To facilitate scale detection on both small vessels and large vessels, the true scale for a given point X regardless of the vessel size is determined by the minimum of both algorithms.

$$\sigma(X) = \min\{\sigma^1(X), \sigma(X)\}$$

In summary, scale detection uses rank filters to deal with the problem of variable signal:
- construct a set of shells with different radius and fixed shell thickness. Those shells are used as probes to find out the size of a vessel
- sort the intensity information inside shell and assign them ranks/orders
- use rank information to decide which shells touches the outside of vessels
- use the radius of this shell as the scale Anisotropic Images It is well known that the OCT, including OCTA, images have lower resolution on the axis direction than the trans-axis directions. This causes the vessel cross-section to be an ellipse, instead of a circle. Furthermore, veins normally have a more flat cross-section than arteries. An improved centerline filter is used to reduce the effects.

$$f_s(r, z) = \begin{cases} 1 & r \le s \text{ and } z \le \sqrt{2} s \\ 0 & r > s \text{ or } z \le \sqrt{2} s \end{cases} \quad (2)$$

Figure 4A:
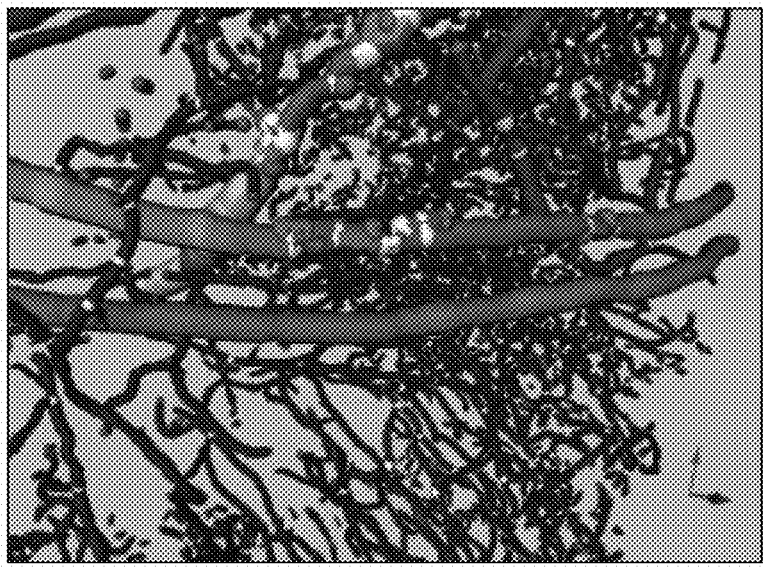
FIGS. 4A-B show the improvements of the centerline filter on a vein.
Figure 4B:
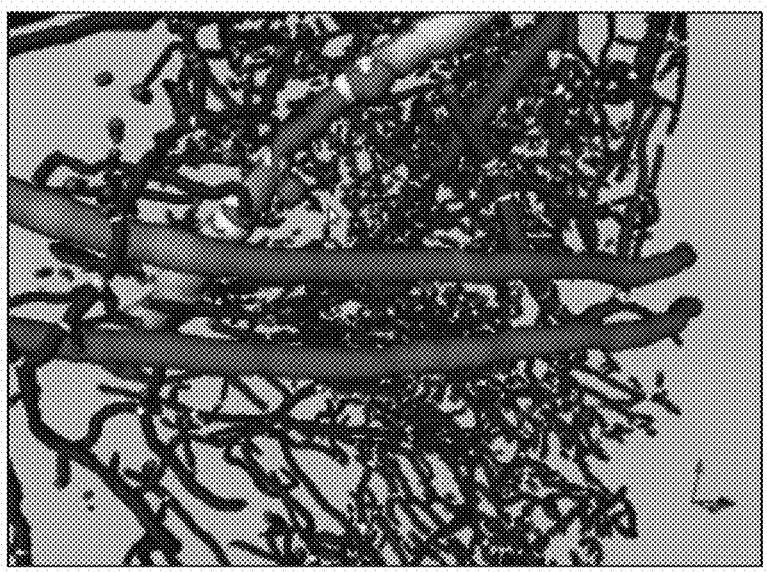

Compared with the normal matching filter, this filter removes the negative kernel in order to pin down the center better. FIG. 4 shows the comparison results before and after modification of the filter. We can see two most front vessels have no branching points which means more poker chips are recovered before linking.

Vasometrics to Detect Retinopathy and Monitor Disease Progression

Figure 5A:
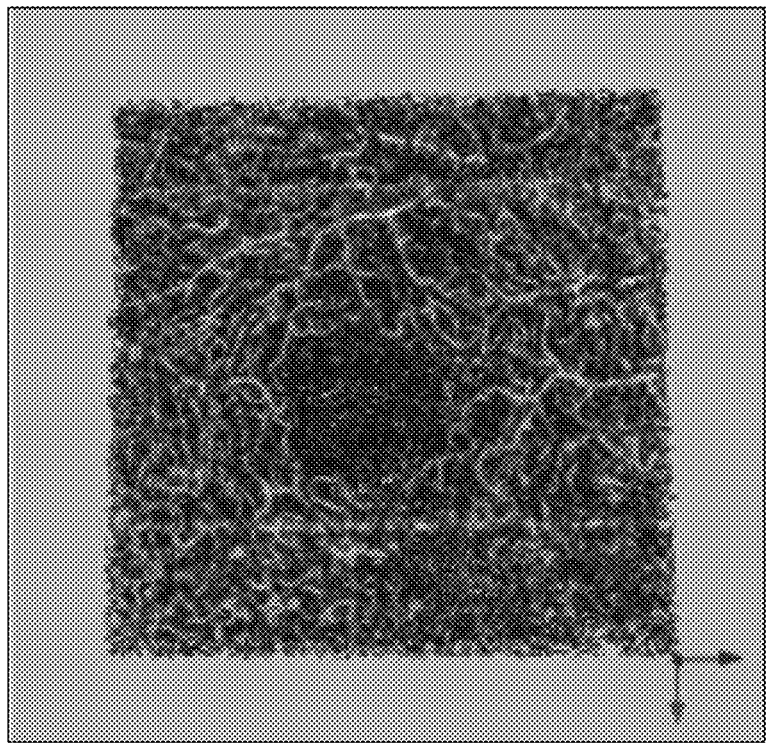
FIGS. 5A-B show examples of retina vessels segmented and linked from 3D OCTA datasets.
Figure 5B:
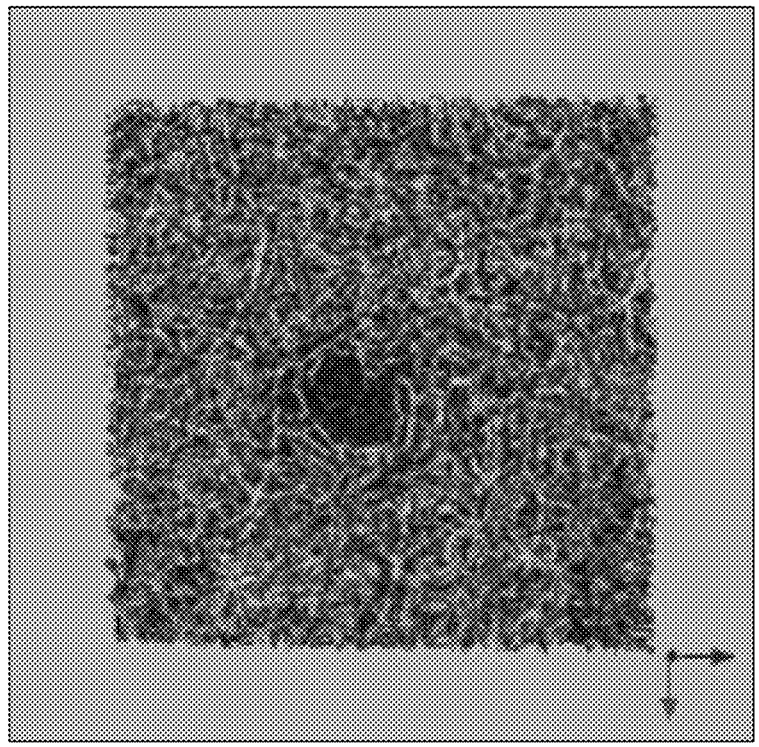
Figure 6A:
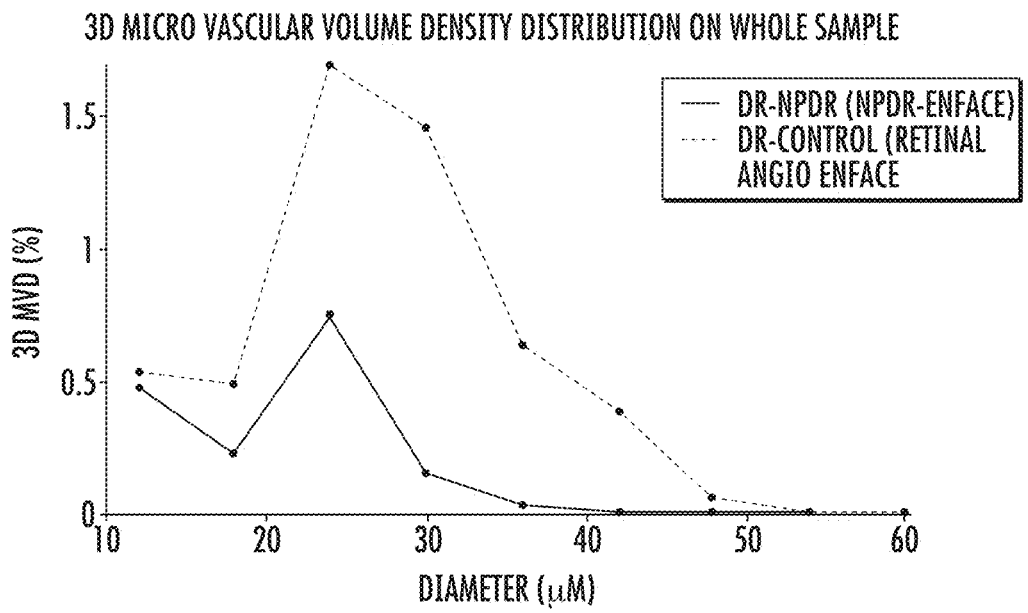
FIGS. 6A-6B show examples of vasometrics on retinopathy.
Figure 6B:
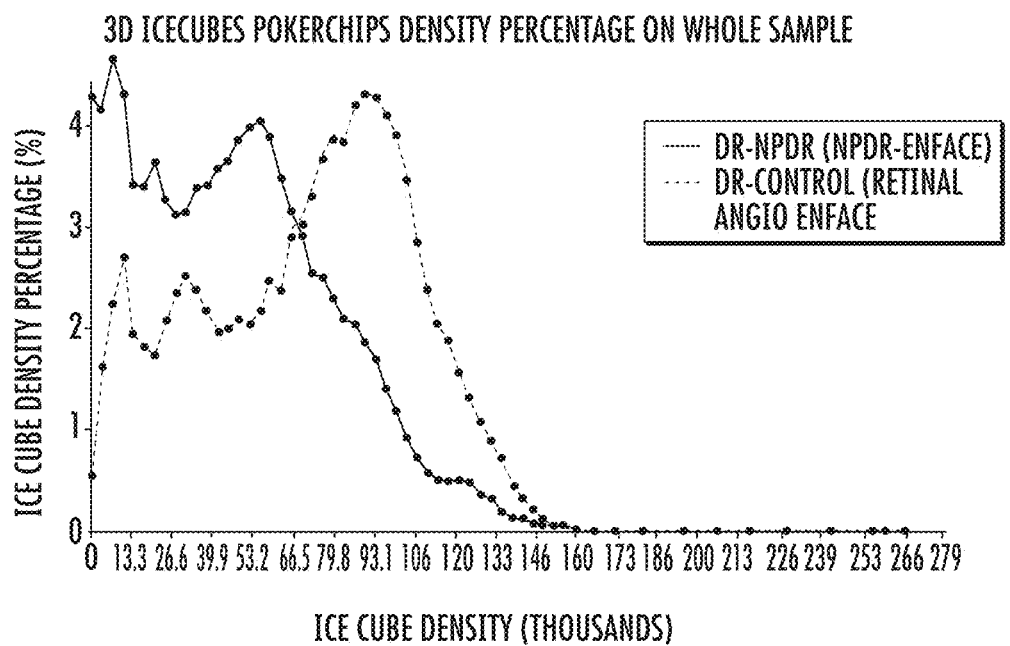

Vessel morphological pattern (vessel metrics) may be used to detect retinopathy and/or monitoring the disease progression. The candidate patterns include, but not limited to, the following elements and the mathematic function of each of these variables:
  The vessel pokerchip density. Number of vessel pokerchips per unit volume
  The vessel branch density. Number of branches per unit volume
  The vessel branching point density. Number of branching points per unit volume
  The vessel branching length distribution. The relative histogram (emperical distribution) of vessel branching length.
  The vessel curvature distribution. The relative histogram of vessel's curvatures
  The vessel tortuosity distribution. The relative histogram of vessel's tortuosity Those features may used to monitor the progression of disease progression and detect retinopathy. FIG. 5 shows an example of diabetic retinopathy progression using the present system. From the segmented vessel network, the vessel morphologic difference between a non-proliferative retinopathy (FIG. 5a) and a healthy retinopathy (FIG. 5b) can be clearly seen. The non-proliferative retinopathy example shows the eliminations of the large vessels and the increase in the number of small vessels, which can be captured by the above variables. A quantitative changes of this example was shown in FIG. 6 using the present system.

Blood vessel geometry obtained from one or more OCT images may be analyzed according to any of the techniques described herein to perform diagnosis or guide therapy of retinal disorders, including but not limited to macular degeneration, diabetic retinopathy, mild nonproliferative retinopathy, moderate nonproliferative retinopathy, severe nonproliferative retinopathy, proliferative diabetic retinopathy and diabetic macular edema (DME). Blood vessel geometry obtained from one or more OCT images may also be analyzed according to any of the techniques described above to perform diagnosis or guide therapy of neurodegenerative disorders, including but not limited to Parkinson's Disease, Alzheimer's disease, amyotrophic lateral sclerosis, olivopontocerebellar atrophy (OPCA), Ataxia telangiectasia, Batten disease, Friedreich's ataxia, Spinal muscular atrophy, Huntington's disease, Lewy body disease, or Hansen's disease. Further conditions that can be detected or predicted via vascular changes in the retina include stroke, cardiovascular disease, heart attack, multiple sclerosis, drug toxicity, eye diseases (including but not limited to Glaucoma), and cancers (including but not limited to retinoblastoma). In some embodiments, diseases are evaluated in a human subject.

In other words, RetinaAngioProbe™ includes methods for analyzing structures or features of retinal blood vessels and evaluating their association with disease, responsiveness to therapeutic treatments, and/or other conditions. This methods provide quantitative and analytical methods for evaluating and/or comparing in vivo retinal blood vessel geometry obtained from multiple OCT images. RetinaAngioProbe™ techniques can be useful in assisting and/or automating the analysis of vascular patterns and their association with disease diagnosis, prognosis, response to therapy, etc., or any combination thereof, using for example, blood vessel structural features (e.g., a distribution of vessel parameters such as structural features or morphological parameters within a region of interest may be generated and evaluated). In some embodiments, vessel parameters may relate to the size, shape, or number of vessels with a region of interest. A distribution may be generated based on quantitative measurements related to one or more parameters. In some embodiments, a distribution of blood vessels may be a population distribution of blood vessels as a function of quantitative measures of one or more parameters. For example, a distribution may represent the number of blood vessels (or the percentage of the blood vessel population) as a function of their diameter, branching frequency, distance between branches, degree of tortuosity, curvature, or any other quantitative structural feature or morphological parameter, e.g., as described herein, or any combination of two or more thereof.

As stated above, the above disclosure described a plurality of methods which may be used to process OCT scans, and more particularly OCT scans of the retina. In addition, each of these methods may be executed by a controller, executing instructions disposed on a non-transitory computer-readable storage medium. Thus, the above disclosure also describes a system for performing these methods, as well as a non-transitory computer-readable storage medium which contains the instructions to perform these methods.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of identifying a 3D region of interest of a retina from a plurality of retinal blood vessels in a 3D optical coherence tomography (OCT) image, comprising more than one OCT image, of at least a portion of the retina, the method comprising:
  using at least one computer programmed to perform:
    obtaining a geometrical representation of a vascular tree or vessel network of retinal blood vessels from the 3D OCT image;
    evaluating at least one first morphological feature of a plurality of retinal blood vessels detected in the geometrical representation of the 3D OCT image at each of a plurality of voxel locations in the geometrical representation; and
    identifying a first region of interest based at least in part on evaluating the at least one first morphological feature of the plurality of retinal blood vessels, wherein the first region of interest comprises a particular retinal layer, wherein evaluating at least one first morphological feature comprises determining a feature field comprising the at least one morphological feature at each of a plurality of voxel locations, and wherein identifying the first region of interest comprises evaluating the feature field.

2. The method of claim 1, wherein identifying the first region of interest comprises constructing a likelihood function of voxels belong to the first region of interest and a smoothness constraint to force the first region of interest to be continuous, based on at least one morphological feature.

3. The method of claim 1, wherein the feature field comprises a vessel diameter field, a vessel density field, a vessel branching point density field, vessel branch length field, vessel curvature field, vessel tortuosity field and/or a vessel branching angle field.

4. The method of claim 1, where the feature field is evaluated relative to known characteristics of each retinal layer.

5. The method of claim 1, wherein the at least one 3D OCT image comprises an OCT angiography(OCTA) image.

6. A method of distinguishing between a plurality of retinal layers from vessel morphology information of retinal blood vessels in a 3D optical coherence tomography (OCT) image, comprising a plurality of OCT images, of at least a portion of a retina, the method comprising:

using at least one computer programmed to perform:

obtaining a geometrical representation of a vascular tree or vessel network of retinal blood vessels from the 3D OCT image;

evaluating at least one first morphological feature of at least one retinal blood vessel at each of a plurality of voxel locations in the geometrical representation; and determining that at least one first voxel location of the plurality of voxel locations belongs to a first layer of the plurality of retinal layers and that at least one second location of the plurality of voxel locations belongs to a second layer of the plurality of retinal layers based on evaluating the at least one first morphological feature, wherein evaluating the at least one morphological feature comprises determining a feature field comprising the at least one morphological feature at each of a plurality of voxel locations, and wherein determining a retinal layer comprises evaluating the feature field.

7. The method of claim 6, wherein the at least one computer is programmed to determine to which of the plurality of retinal layers each of the plurality of voxel locations belongs.

8. The method of claim 6, wherein the at least one first morphological feature comprises vessel a directional vessel density field at each of the plurality of voxel locations.

9. The method of claim 6, wherein evaluating the at least one morphological feature comprises evaluating a vessel diameter field, a vessel density field, a vessel branching point density field, vessel branch length field, vessel curvature field, vessel tortuosity field and/or a vessel branching angle field at each of the plurality of voxel locations relative to known characteristics of each retinal layer.

10. The method of claim 6, wherein the feature field comprises a vessel diameter field, a vessel density field, a vessel branching point density field, vessel branch length field, vessel curvature field, vessel tortuosity field and/or a vessel branching angle field.

11. The method of claim 6, wherein the feature field is evaluated relative to known characteristics of each retinal layer.

12. The method of claim 6, wherein the 3D OCT image comprises an OCT angiography (OCTA) image.

* * * * *